April 17, 1962    R. L. LICH    3,030,074
TURNTABLE SUPPORT
Filed June 29, 1960    2 Sheets-Sheet 1
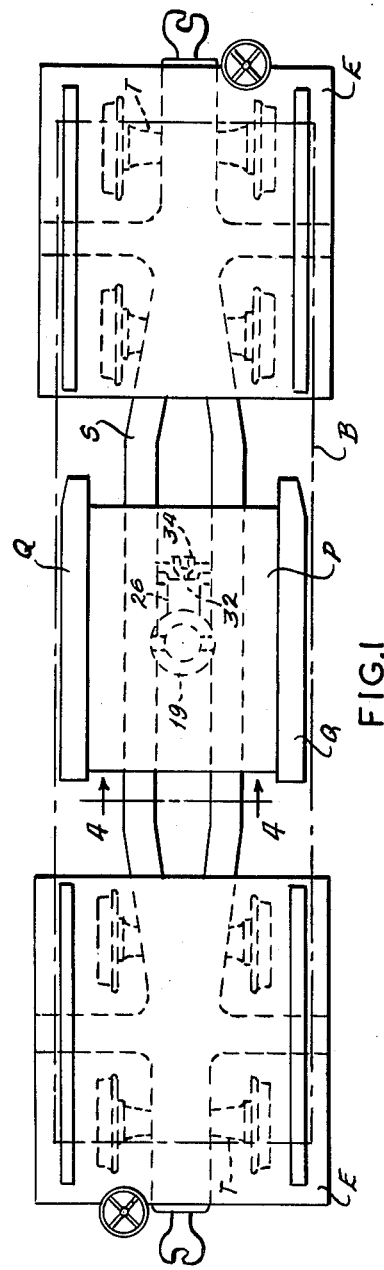
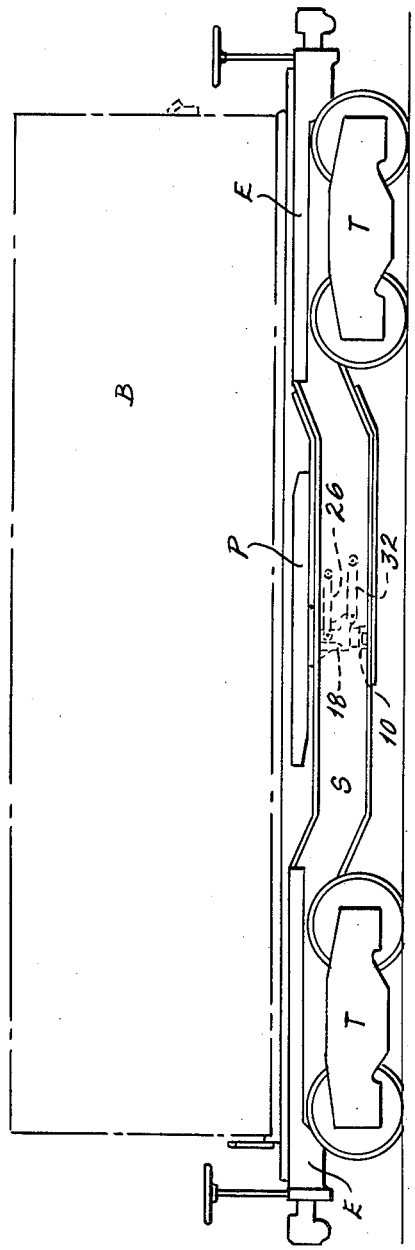
INVENTOR:
RICHARD L. LICH
BY Francis A. Burgess
ATTORNEY.

April 17, 1962 R. L. LICH 3,030,074
TURNTABLE SUPPORT
Filed June 29, 1960 2 Sheets-Sheet 2

INVENTOR:
RICHARD L. LICH
BY Francis T. Burgess
ATTORNEY.

3,030,074
Patented Apr. 17, 1962

3,030,074
TURNTABLE SUPPORT
Richard L. Lich, Ferguson, Mo., assignor to General Steel Industries, Inc., a corporation of Delaware
Filed June 29, 1960, Ser. No. 39,514
4 Claims. (Cl. 254—93)

The invention relates to railway rolling stock of the type used to transport highway trailer bodies and large freight containers, and consists particularly in a stable support for a car-mounted turntable for transferring such bodies of containers onto and off of railway cars.

In a well-known system of handling highway trailer bodies by rail, the railway car underframe is provided, intermediate its ends, with a vertically movable and rotatable turntable equipped with trackways adapted to slidably receive longitudinal skids or other sill structure on the bottom of a highway trailer body. For loading trailers on cars so equipped, the trailer is backed up at right angles to the track, the turntable rotated to a position transverse of the car body and is elevated to the proper height to receive the trailer body skids, the trailer body is disengaged from its bogie, and the tractor backs the trailer onto the turntable until it is approximately centered on the turntable. The turntable is then rotated until the trailer body is longitudinally aligned with the car body, and the turntable is lowered until the ends of the trailer are seated on the end portions of the car body. Because of the difficulty of loading a relatively long trailer body uniformly, and of precisely centering it on the turntable, the turntable may frequently be urged towards a non-horizontal position by an unbalanced trailer load, and since in conventional structures the pintle about which the turntable rotates may be the piston of the hydraulic lift device, the piston will be correspondingly moved to a non-vertical position, and so out of axial alignment with the hydraulic cylinder.

It is a main object of the invention to provide means, independent of the piston-cylinder relationship of the hydraulic lift device, for stabilizing the turntable support in a structure of this type against tilting.

It is a further object to provide a railway car turntable device in which the hydraulic lift mechanism functions solely as a lift mechanism, and not as a means for stabilizing the supported turntable against tilting.

It is an additional object to provide a railway car-mounted turntable support in which the turntable support is stabilized against tilting by laterally and vertically spaced connections to the supporting car underframe.

The foregoing and other objects and advantages of the invention will be apparent to those skilled in the art from a study of the following description and the accompanying drawings in which:

FIGURE 1 is a plan view of a railway car embodying the invention.

FIGURE 2 is a side elevation of the car illustrated in FIGURE 1, showing a highway trailer body mounted on the end portions of the car and the turntable in its normal depressed traveling position.

Figure 3:
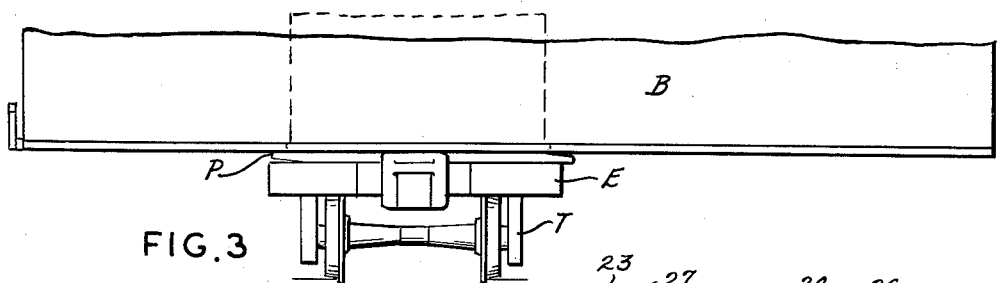
FIGURE 3 is a transverse view of the car shown in FIGURES 1 and 2 showing a trailer body positioned transversely thereof.
Figure 5:
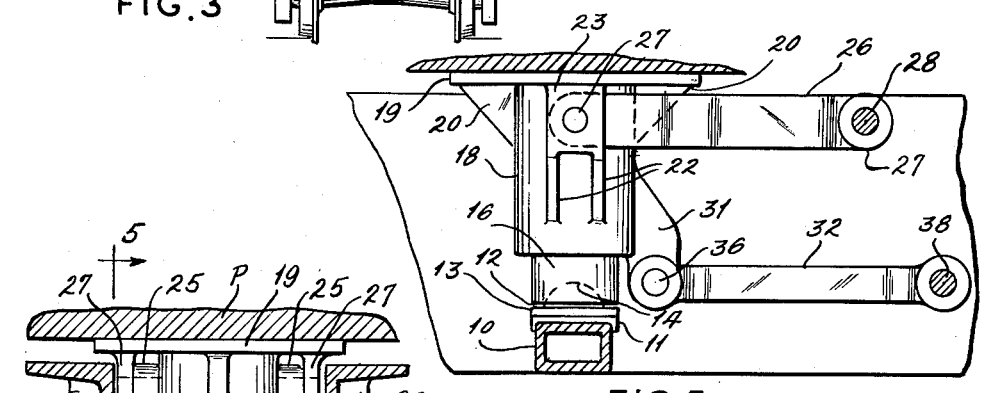
FIGURE 5 is a side view of the device illustrated in FIGURE 4.
Figure 4:
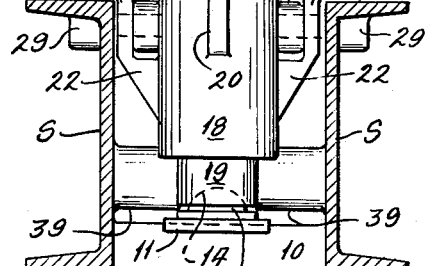
FIGURE 4 is an end view of the turntable lifting and stabilizing device embodying the invention, taken from the line 4—4 of FIGURE 1.
Figure 6:
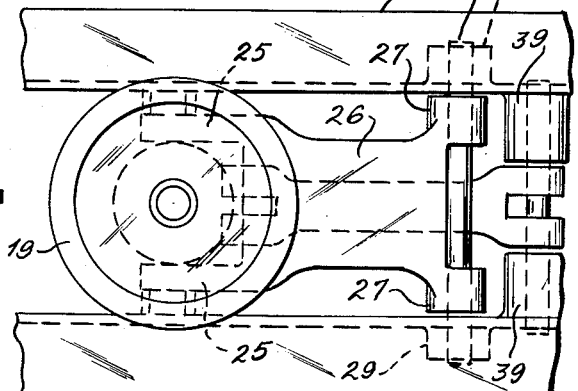
FIGURE 6 is a top view of the lifting and stabilizing device.
Figure 7:
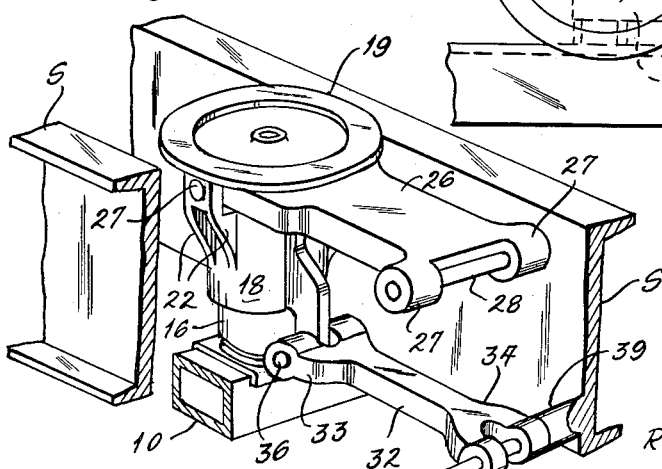
FIGURE 7 is a perspective view of the device shown in FIGURES 4 through 6.

Referring now to the drawings, the car shown in FIGURES 1, 2, and 3 comprises the usual spaced four-wheel trucks T, and an underframe supported at its ends thereon and consisting of relatively high-level decked end portions E connected by a pair of laterally-spaced outwardly-flanged channel-shaped sills S, the central and major portions of sills S being at a substantially lower level than the decked end portions.

At the center of the car, sills S are connected by a transverse box section member 10, to the horizontal top surface of which is secured a hardened steel wear plate 11. A convex semi-spherical bearing member 12, provided with a downwardly-facing horizontal bearing plate 13 is slidably mounted on member 11. Spherical member 12 is movably received within a mating spherical recess 14 in the lower end of vertical hydraulic piston 16, which in turn is vertically slidably received within a hydraulic cylinder 18, the enlarged horizontal top 19 of which forms a support for the rotatable mounting thereon of a turntable P, the sides of which form spaced trackways Q for slidably receiving correspondingly spaced skids on a highway trailer body B or other freight container. Turntable P is normally positioned, as shown in FIGURE 1, with trackways Q parallel to the longitudinal axis of the supporting car.

The turntable-supporting horizontal top 19 is of substantially greater diameter than cylinder 18, outwardly extending periphery being partially supported thereon by fore and aft gussets 20. At each side of the cylinder, additional support is afforded the top member 19 by a pair of vertical ribs 22 spaced apart circumferentially of the cylinder and extending transversely of the car therefrom, their upper portions merging with each other through a vertical web 23 spaced a slight distance outwardly from the cylinder wall. Members 22 are apertured between webs 23 and the cylinder wall to permit the intrusion therein of the end bifurcations 25 of upper stabilizing link 26, which are pivotally connected on a common transverse axis to the cylinder structure, by means of pins 24. Link 26 is relatively wide, occupying the major portion of the space between the sills S, its cylinder-connected end being bifurcated as mentioned above to permit the cylinder to be positioned between the bifurcations 25, and its opposite end is formed with widely spaced pivot bearings 27 through which pass a common pivot pin 28 extending into and secured in bosses 29 on the vertical webs of channel sills S. Because of the wide lateral spacing of the pivots comprising pins 24 connecting link 26 to the cylinder and of connecting means 27, 28, 29, by means of which the link is connected to the sills, any tendencies of the turntable to tilt transversely relative to the car underframe due to unbalanced loading of a trailer body B will be resisted. Any such tilting as might occur through yielding of the link 26 or looseness in the pivotal connections between link 26 and the cylinder and the sills will not interfere with the operation of the hydraulic lift device since any inclinations of the cylinder 18 will be accompanied by a corresponding inclination of piston 16, freely accommodated by movement of piston 16 about the semi-cyclindrical bearing 12 and transverse sliding of horizontal bearing plate 13 on fixed wear plate 11.

For resisting tendencies of the turntable to tilt lengthwise of the car about a transverse axis, cylinder 19 is provided with a radially-extending depending bracket 31, on the longitudinal center line of the car. A second longitudinally-extending link 32 of the same length as link 26 is provided with bifurcated end portions 33 and 34, one of which receives and is pivotally connected on a transverse axis by a pin 36 to a bracket 31 on the cylinder, the other end being connected by means of a pin 38 to the vertical webs of channel sills S, pin 38 being received within a suitable boss 39 on the sill webs. The distance between pivot pins 24 and 36 connecting links 26 and 32 to cylinder 18 is the same as the distance between the pivot pins 28 and 38 connecting links 26 and 32 to the sills, so that the links are in parallel relation with each other. Because of the parallelism of the links and of the fact that they are of equal length, any axial movement of cylinder 18 relative to piston 16 will be vertical irrespective of any imbalance of the load on the turntable which might tend to tilt the turntable longitudinally of the car. The spacing between the pivotal connections of links 26 and 32 to the cylinder and sills provides a relatively long substantially vertical arm which, in combination with the rigidity of the links and their pivotal connections, will develop a substantial moment additionally resisting tendencies of the cylinder to tilt transversely of the car.

It will be noted that as the cylinder 18 is raised on its piston 16, the horizontal distances between pivot pins 24 and 28 and 36 and 38 will be correspondingly foreshortened, but this foreshortening will be accommodated by sliding of member 13 on plate 11 lengthwise of the car when this occurs.

Operation of the device is as follows:

When it is desired to load a trailer body on a car embodying the invention, the turntable P is rotated until its trackways Q extend transversely of the car body, a trailer body B carried by the usual bogie at its rear ends and by a highway tractor at its forward end is backed at right angles toward the car so that it is aligned with the trackways Q of turntable P. The turntable is hydraulically elevated by piston 16 and cylinder 18 until it is at substantially the proper height to engage skids (not shown) on the bottom of trailer body B. The trailer is then backed by the tractor until body B is partially supported on turntable Q, the highway bogie is released from its connection to the trailer underframe, and the trailer is backed onto the turntable until it is approximately centered thereon. The tractor is then uncoupled from the trailer body, the turntable is rotated until the trailer is aligned with the car body, and the turntable is then hydraulically lowered to the position shown in FIGURE 2. It will be evident from the foregoing that as the trailer was being backed upon the turntable, and even after it was approximately centered on the turntable, due to the difficulty of equally distributing the trailer lading, unbalanced vertical forces were applied to the turntable tending to cause it and the supporting hydraulic lift mechanism to tilt transversely of the car about an axis extending longitudinally of the car. This tendency was opposed largely by the wide spacing of the pivots of upper link 26 and by the vertical arm between the upper pivot axes and the lower pivot axes of link 32. If, however, any slight tilting of the cylinder 18 should occur despite the resistance offered by the arms 26 and 32 and their pivotal connections, piston 19 would be free to incline at the same angle as cylinder 18, because of the spherical and sliding bearing mounting of piston 19 on underframe transverse member 10. During swiveling of the turntable from its transverse loading position to its longitudinal traveling position, the tendency to tilt responsive to an unbalanced load imposed by the trailer body, is initially opposed principally as described above and finally by the parallel ruler arrangement of arms 26 and 32, whereby irrespective of height of the turntable, the axes of the cylinder and piston always remain in a vertical plane extending transversely of the car, and even though raising or lowering of the cylinder causes a foreshortening or elongation, respectively, of the distances between the pivotal connections of links 26 and 32, the piston will at no time become cocked within the cylinder because its bearing is free to slide longitudinally of the car with respect to the supporting transverse member 10.

Removing the trailer body from the car is accomplished in substantially the reverse order of the steps described above, and the functioning of the turntable support stabilizing arrangement is the same.

The details of the structure may be varied substantially without departing from the spirit of the invention and the exclusive use of those modifications as come within the scope of the appended claims is contemplated.

What is claimed is:

1. A turntable support including a pair of longitudinally-extending laterally spaced sills, a transverse member connecting said sills below their tops, a normally upright piston carried by said transverse member, a cylinder vertically slidably receiving said piston and extending upwardly therefrom and adapted to swively support the turntable, a pair of longitudinally-extending vertically-spaced parallel links of equal length pivotally connected at one end to said cylinder and at their other end to said sills and extending longitudinally between said sills, at least one of said links having its connections to said cylinder and said sills widely spaced transversely of said sills whereby to oppose tendencies of said cylinder to tilt transversely of said sills.

2. A turntable support according to claim 1 in which the support of said piston on said transverse member includes mating semi-spherical bearings on said piston and said transverse member for accommodating inclinations of said piston to those of said cylinder caused by unbalanced loads on the supported turntable.

3. A turntable support according to claim 2 in which one of said mating semi-spherical bearings is horizontally slidably mounted on said transverse member whereby to accommodate slight inclinations of said cylinder and piston and horizontal movements of said cylinder and piston caused by elevation of said cylinder on said piston and consequent foreshortening of the horizontal distances between the connections of said links to said cylinder and said sills, respectively.

4. A turntable support according to claim 1 in which the upper of said links is bifurcated at one end to embrace the cylinder, its pivotal connections to the cylinder being co-axial with the transverse diameter of the cylinder and in proximate relation with the top of the cylinder whereby to provide lateral arms at nearly the same level as the support of the turntable on the cylinder resisting tendencies of the turntable to cause transverse inclinations of the cylinder.

References Cited in the file of this patent
UNITED STATES PATENTS

| | | |
|---|---|---|
| 971,115 | Bronder | Sept. 27, 1910 |
| 2,933,053 | Mellam | Apr. 19, 1960 |